US008441983B2

(12) United States Patent
Calhoun et al.

(10) Patent No.: US 8,441,983 B2
(45) **Date of Patent: *May 14, 2013**

(54) MAINTAINING POINT OF PRESENCE AT TUNNELING ENDPOINT FOR ROAMING CLIENTS IN DISTRIBUTED WIRELESS CONTROLLER SYSTEM

(75) Inventors: Patrice Calhoun, Pleasanton, CA (US); Abhijit Choudhury, Cupertino, CA (US); Rohit Suri, Fremont, CA (US); Sudhir Jain, Fremont, CA (US); Bhanu Gopalasetty, San Jose, CA (US); Navindra Yadav, Cupertino, CA (US); Fusun Ertemalp, Palo Alto, CA (US); Kent Leung, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/773,360

(22) Filed: May 4, 2010

(65) Prior Publication Data

US 2011/0274036 A1 Nov. 10, 2011

(51) Int. Cl.
*H04W 40/00* (2009.01)

(52) U.S. Cl.
USPC ........... 370/328; 370/331; 370/329; 370/338; 455/436; 455/439

(58) Field of Classification Search .................. 370/328, 370/331, 329, 338; 455/436, 439
See application file for complete search history.

(56) References Cited

U.S. PATENT DOCUMENTS

| | | | | |
|---|---|---|---|---|
| 5,758,281 | A | 5/1998 | Emery et al. | |
| 6,490,259 | B1 * | 12/2002 | Agrawal et al. | 370/331 |
| 6,654,359 | B1 | 11/2003 | La Porta et al. | |
| 6,961,774 | B1 | 11/2005 | Shannon et al. | |
| 6,970,459 | B1 | 11/2005 | Meier | |
| 7,061,896 | B2 * | 6/2006 | Jabbari et al. | 370/338 |

(Continued)

FOREIGN PATENT DOCUMENTS

WO 2010053624 A1 5/2010

OTHER PUBLICATIONS

Johnson et al., "Mobility Support in IPv6", Network Working Group, RFC 3775, Jun. 2004, pp. 1-143.

(Continued)

*Primary Examiner* — Ricky Ngo
*Assistant Examiner* — Rasheed Gidado
(74) *Attorney, Agent, or Firm* — Edell, Shapiro & Finnan, LLC

(57) ABSTRACT

Techniques are provided to support roaming of wireless devices in a network such that the wireless devices can keep their Internet Protocol (IP) addresses as they roam within and across mobility sub-domains. When a wireless device roams from one access switch to another access switch, a tunneling endpoint apparatus in the wireless device's home mobility sub-domain is configured to serve as the point of presence for the roamed wireless device. Traffic for the roamed wireless device is tunneled from the access switch where the wireless device has roamed (where it is currently attached) to the tunneling endpoint apparatus. When the wireless device roams across mobility sub-domains, then traffic is tunneled from the access switch where the wireless device is currently attached to the tunneling endpoint apparatus in that mobility sub-domain (called a "foreign" mobility sub-domain) to the tunneling endpoint apparatus in the wireless device's home mobility sub-domain.

11 Claims, 7 Drawing Sheets

U.S. PATENT DOCUMENTS

| | | | | |
|---|---|---|---|---|
| 7,146,636 | B2 * | 12/2006 | Crosbie | 726/7 |
| 7,596,376 | B2 * | 9/2009 | Calhoun et al. | 455/436 |
| 7,639,648 | B2 | 12/2009 | Nagarajan et al. | |
| 2002/0085719 | A1 | 7/2002 | Crosbie | |
| 2004/0221042 | A1 * | 11/2004 | Meier | 709/227 |
| 2004/0252653 | A1 * | 12/2004 | Shimizu et al. | 370/310 |
| 2005/0036471 | A1 | 2/2005 | Singh et al. | |
| 2005/0165953 | A1 | 7/2005 | Oba et al. | |
| 2006/0187878 | A1 * | 8/2006 | Calhoun et al. | 370/331 |
| 2006/0240825 | A1 | 10/2006 | Funabiki et al. | |
| 2006/0245393 | A1 | 11/2006 | Bajic | |
| 2006/0245404 | A1 | 11/2006 | Bajic | |
| 2007/0070959 | A1 * | 3/2007 | Almeroth et al. | 370/338 |
| 2007/0140163 | A1 | 6/2007 | Meier et al. | |
| 2007/0147300 | A1 | 6/2007 | Jee et al. | |
| 2007/0160008 | A1 | 7/2007 | Burgess | |
| 2007/0160017 | A1 * | 7/2007 | Meier et al. | 370/338 |
| 2008/0002607 | A1 * | 1/2008 | Nagarajan et al. | 370/328 |
| 2008/0002642 | A1 | 1/2008 | Borkar et al. | |
| 2008/0043665 | A1 | 2/2008 | Jeon et al. | |
| 2008/0107070 | A1 | 5/2008 | Sastry | |
| 2008/0130598 | A1 | 6/2008 | Kalhan | |
| 2008/0175201 | A1 * | 7/2008 | Ahmavaara et al. | 370/331 |
| 2009/0059924 | A1 | 3/2009 | Muramoto et al. | |
| 2009/0093232 | A1 | 4/2009 | Gupta et al. | |
| 2009/0161590 | A1 | 6/2009 | Lewis et al. | |
| 2010/0172293 | A1 * | 7/2010 | Toth et al. | 370/328 |
| 2010/0232306 | A1 | 9/2010 | Jeon et al. | |
| 2010/0290398 | A1 | 11/2010 | Choudhary et al. | |

OTHER PUBLICATIONS

Narten et al., “Neighbor Discovery for IP Version 6 (IPv6)”, Network Working Group, RFC 4861, Sep. 2007, pp. 1-84.

Prommak C. et al., “Next Generation Wireless LAN System Design”, Military Communications Conference, MILCOM 2002, Proceedings, Anaheim, CA, Oct. 7-10, 2002, NY, NY, US, vol. 1, Oct. 7, 2002, pp. 473-477.

International Search Report and Written Opinion in PCT/US2011/034883 dated Jul. 4, 2011.

* cited by examiner

MAINTAINING POINT OF PRESENCE AT TUNNELING ENDPOINT FOR ROAMING CLIENTS IN DISTRIBUTED WIRELESS CONTROLLER SYSTEM

RELATED APPLICATIONS

This application is related to the following commonly assigned co-pending U.S. Patent Applications filed on May 4, 2010:

U.S. patent application Ser. No. 12/773,351, entitled "Maintaining Point Of Presence At Access Switch For Roaming Clients In Distributed Wireless Controller System."

U.S. patent application Ser. No. 12/773,355, entitled "Routing To The Access Layer To Support Mobility Of Internet Protocol Devices."

TECHNICAL FIELD

The present disclosure relates to networking techniques capable of supporting mobility of a network device.

BACKGROUND

Networked services to wired and wireless devices are supported by equipment that makes up what may be referred to as the "infrastructure" of the network. Examples of equipment in the network infrastructure include routers, access switches and control computers or servers that are used to store data pertaining to the status of devices that connect to the network. Some access switches have routing capabilities and in this regard are also referred to as "forwarders" because they forward packets from one access switch to another.

A device with networking capability, referred to herein as a "client device" or "station", may connect to the network at one access switch and then physically move, i.e., roam, such that it connects to a different access switch in the network. This roaming capability is prevalent with client devices that have wireless capabilities and can connect to a wired network at a different access switch by establishing a wireless connection, such as a wireless local area network (WLAN) connection with a wireless access point (AP) device.

Wireless is one of the many services being integrated within an access switch. The wireless service ensures that the access layer terminates the data plane, to facilitate the delivery of a converged architecture. Convergence implies that regardless of whether the traffic originates from a wired or wireless station the same set of features can be applied. There will be unification at the management and configuration level for the end customer, and wired and wireless will become an access method into the organization. Unification implies that mobility services are provided to both wireless and wired stations.

DESCRIPTION OF EXAMPLE EMBODIMENTS

Overview

Techniques are provided to support roaming of wireless devices in a network such that the wireless devices can keep their Internet Protocol (IP) addresses as they roam within and across mobility sub-domains. When a wireless device roams from one access switch to another access switch, a tunneling endpoint apparatus in the wireless device's home mobility sub-domain is configured to serve as the point of presence for the roamed wireless device. Traffic for the roamed wireless device is tunneled from the access switch where the wireless device has roamed (where it is currently attached) to the tunneling endpoint apparatus. When the wireless device roams across mobility sub-domains, then traffic is tunneled from the access switch where the wireless device is currently attached to the tunneling endpoint apparatus in that mobility sub-domain (called a "foreign" mobility sub-domain) to the tunneling endpoint apparatus in the wireless device's home mobility sub-domain.

In order to provide topology transparency to stations/devices as they roam within the network, the network infrastructure equipment needs to provide for seamless roaming. From the station's perspective, any mobility event should not change its IP address, its default router or Dynamic Host Configuration Protocol (DHCP) server. This means that as stations roam, they send an Address Resolution Protocol (ARP) request to their default router, or transmit a DHCP request to the server that had previously assigned its address. A hierarchical mobility architecture is provided that supports seamless mobility in networks where wireless services are terminated at the access switch. The point of presence of the roamed station is at a distribution switch/tunneling endpoint apparatus that serves the IP subnet for the station after it has roam to another access switch.

Example Embodiments

Figure 1:
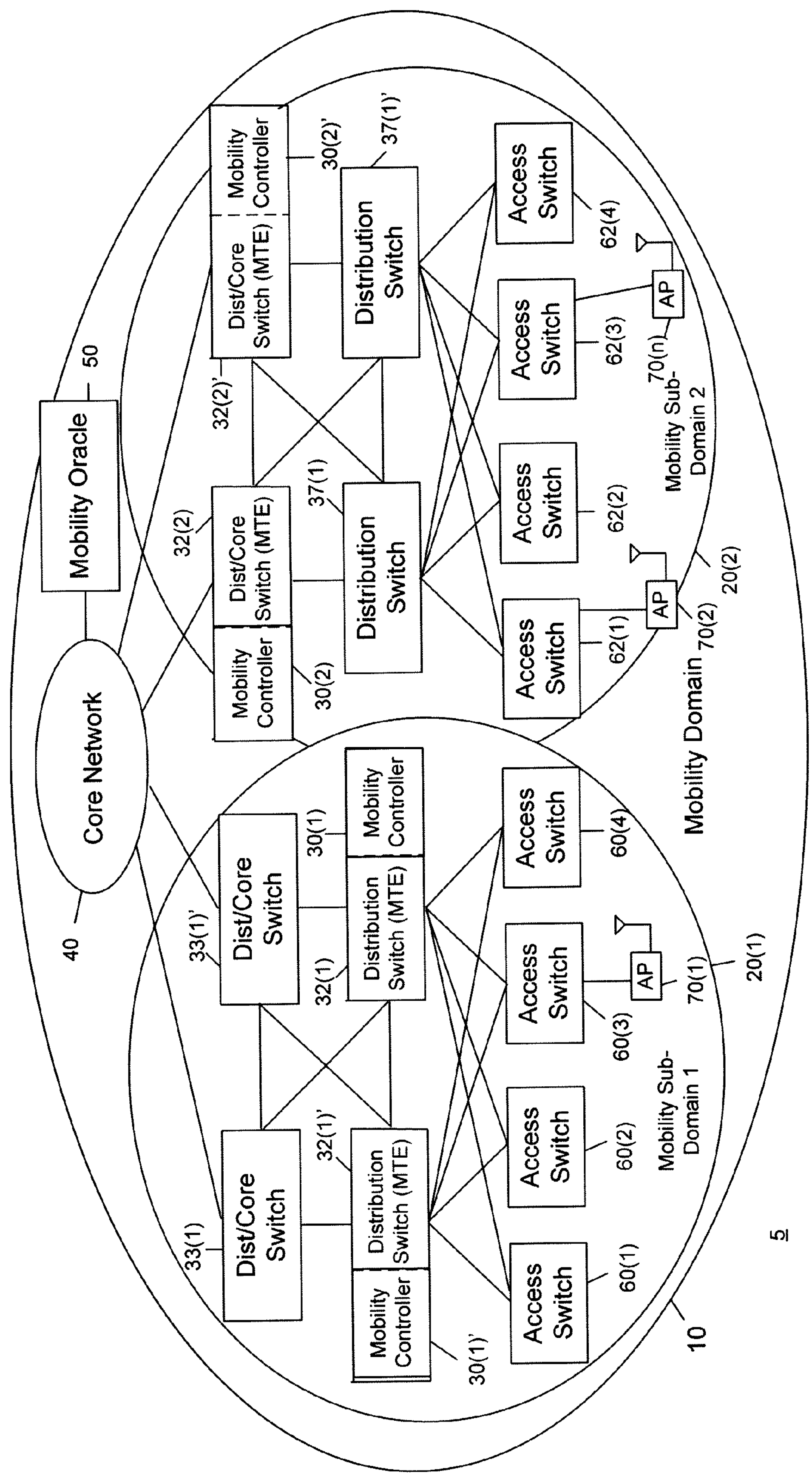
FIG. 1 is an example of a diagram of a network infrastructure architecture.

Reference is first made to FIG. 1. FIG. 1 illustrates a diagram depicting a network infrastructure architecture that is configured to support mobility of wireless client devices. The network architecture 5 comprises a mobility domain shown at reference numeral 10. A mobility domain is a geographical region for which roaming services are to be provided. Contiguous coverage is intended to be provided in this geographical region by the network architecture 5. The network architecture 5 provides better scaling properties over existing systems in that it breaks down the traditional mobility group into multiple mobility sub-domains. Thus, a mobility domain includes one or more mobility sub-domains. For simplicity, FIG. 1 shows two sub-domains 20(1) and 20(2) and labeled Mobility Sub-Domain 1 and Mobility Sub-Domain 2, respectively. For instance, a mobility sub-domain could consist of a single building within a campus. A sub-domain is more of a representation of the network topology than the physical walls of a building, so it is also possible for a mobility sub-domain to span multiple buildings in a campus, for example.

The network architecture 5 further comprises a mobility controller and a mobility oracle. In one form, each mobility sub-domain includes one or more mobility controllers (MCs) and mobility tunnel endpoint (MTE) pairs. While more than a single MC-MTE pair may be present in a sub-domain, only one may be active at any given time. The provision of multiple pairs in a sub-domain is for resilience and failure back up. In another fonn, a single MC is provided for the entire mobility domain. Said another way, for networks that consist of more than a single mobility sub-domain, the mobility oracle is provided. The mobility oracle is a centralized database that includes information on each of the stations in the mobility domain, the home mobility sub-domain for each station and the current foreign sub-domain providing service to each station. The mobility oracle is consulted by the individual MCs in order to facilitate inter mobility sub-domain mobility events.

FIG. 1 shows that in mobility sub-domain 20(1) there is a mobility controller 30(1) paired with an MTE 32(1) and a backup mobility controller 30(1)' paired with a backup MTE 32(1)'. Similarly, in mobility sub-domain 20(2) there is a mobility controller 30(2) paired with an MTE 32(2) and a backup mobility controller 30(2)' paired with a backup MTE 32(2)'. The MTE is a tunneling endpoint apparatus and its functions are described further hereinafter.

In the example architecture shown in FIG. 1, the functions of the MTEs in each sub-domain may be incorporated or integrated with other network equipment. For example, in sub-domain 20(1), the MTEs 32(1) and 32(1)' may be incorporated into a distribution switch and further connected to distribution/core switches 33(1) and 33(1)', respectively. The distribution/core switches 33(1) and 33(1)' are in turn connected to a core network 40 that represents a Layer 3 or "core" portion of the network architecture 5. In mobility sub-domain 20(2), the MTEs 32(2) and 32(2)' may be integrated into respective distribution/core switches that are in turn connected to the core network 40. In this case, there are distribution switches 37(1) and 37(1)' connected to MTEs 32(2) and 32(2)' in sub-domain 20(2).

As explained further hereinafter, when the MTE for a mobility sub-domain is located at a routing boundary for that sub-domain, e.g., such as in a distribution switch as depicted in FIG. 1, and the MTE has access to all the virtual local area networks (VLANs) or Internet Protocol (IP) subnets served by the access switches in the mobility sub-domain, then the point of presence for a Layer 3 roamed station may move to the MTE. The MTE is connected to the core network 40 by an IEEE 802.1q trunk that consequently has access to all the wireless VLANs or subnets served by all access switches in the MTE's mobility sub-domain that may be visited by roamed/mobile stations. This allows the MTE to natively act as the point of presence for any station that is assigned an IP address which is part of an IP subnet, i.e., VLAN, that is served by an access switch in that mobility sub-domain.

Briefly, IEEE 802.1q or "VLAN Tagging" is a networking standard written by the IEEE 802.1 workgroup allowing multiple bridged networks to transparently share the same physical network link without leakage of information between networks. IEEE 802.1 Q is also used to refer to the encapsulation protocol that implements this mechanism over Ethernet networks.

A mobility controller provides the mobility control plane operations, facilitating mobility events that occur both within a mobility sub-domain, as well as across sub-domains. To this end, an entity called the mobility oracle 50 is provided. The mobility oracle 50 is a centralized control apparatus that comprises database that includes information on each of the client devices in the mobility domain, their home mobility sub-domain and the current foreign sub-domain providing service. The mobility oracle 50 is consulted by the individual mobility controllers in order to facilitate inter sub-domain mobility events. The mobility oracle 50 is shown coupled to the core network 40, but it may also be connected at the sub-domain level to any of the mobility sub-domains. As with the mobility sub-domain's mobility controller, more than one mobility oracle may be deployed for redundancy purposes, although only one would be active at any given time for the mobility domain.

Within each mobility sub-domain are access switches that provide the access layer connectivity to client devices operating in the mobility domain 10. For example, mobility sub-domain 20(1) has access switches 60(1)-60(4) and mobility sub-domain 20(2) has access switches 62(1)-62(4).

Each access switch is capable of serving one or more IP subnets. An IP subnet comprises a plurality of IP addresses. An IP address for a client device can be assigned by a DHCP server, it can be statically configured on the client device or the client device can auto generate the IP address from a subnet served by its home access switch. It is possible that two or more access switches may serve the same IP subnet(s).

A client device obtains an IP address the first time it connects to the network, but it may also obtain another IP address thereafter. For example, an IPv6 client device can obtain a new IP address at any time, and thus can have multiple IP addresses. In general, the client device determines when to obtain an IP address.

A switch peer group is statically configured by the MC, based on static information or information that is dynamically learned. Within a switch peer group, every switch has to have the same view of the membership of the group. A switch peer group does not span across mobility sub-domains or routing boundaries. A mobility sub-domain may have one or more switch peer groups. A purpose of the switch peer group is to allow access switches, between which client devices roam, to interact directly during handoff events. This permits a network to scale by eliminating the need for the MC to be involved in each and every handoff within a mobility sub-domain. Tunnels optionally directly connect the access switches in a switch peer group. If present, these tunnels allow data traffic to be directly sent from one access switch to another in the same switch peer group, without involving the MTE.

As explained hereinafter, client devices associate to an access switch, either by a wired network connection, or a wireless network connection (through a wireless access point device). FIG. 1 shows wireless access point (AP) devices at reference numerals 70(1)-70(*n*). The AP devices support the Control and Provisioning of Wireless Access Points (CAPWAP) protocol. As the CAPWAP architecture specifies, the APs perform the physical (PHY) layer and real-time IEEE 802.11 MAC functions, which includes IEEE 802.11 encryption. The AP establishes a tunnel to the access switch to tunnel client devices' wireless traffic. Thus, an AP is said to be "on"

an access switch when it is configured to tunnel traffic for a wireless device to the access switch.

The APs encrypt all CAPWAP control traffic using the Datagram Transport Layer Security (DTLS) protocol. If the AP supports Cisco TrustSec (CTS) or IEEE 802.1AE (MacSec) encryption, then a link between the switch and the AP may be protected by Layer 2 CTS, in which case both CAPWAP control messages and CAPWAP traffic will get encrypted. If CTS is not supported, then the CAPWAP data traffic is unencrypted. In one possible form, CAPWAP data traffic can also be DTLS encrypted as an option.

Each MTE provides mobility services on the data plane, ensuring that a client device's point of presence on the Layer 3 network remains constant across mobility events. An MTE's involvement in a routing scenario for a client device is optional in that the functions of the MTE are only utilized when tunneling is employed, as described in more detail hereinafter in connection with FIGS. 6-9.

FIG. 1 shows the MTE function as being located in either the distribution or the distribution/core switch. The location of the MTE is shown in this way purely for illustrative purposes as it could reside in any number of devices, integrated in switches/routers or in stand-alone appliances. The actual embodiment of the MTE may depend upon the switches, routers and appliances supporting a tunneling process described herein. The MTE can have two different roles depending on the availability of the subnets for the roamed client device at the MTE. If the subnet of the roamed client device is available at the MTE, the MTE could become the point of presence; otherwise the MTE functions as a tunnel switching entity that connects the roamed client device to the point of presence, which could be an access switch. The MTE may be integrated in a border router in each sub-domain. In this example, the MTEs may be integrated with border or edge routers of their respective sub-domain. The MTE functions serves as a tunneling endpoint apparatus with respect to traffic for devices by tunneling the traffic to access switches in its mobility sub-domain, and in cases where a device roams to a different mobility sub-domain, by tunneling traffic with another MTE in the foreign mobility sub-domain to which the device roams. This is described further hereinafter in connection with FIGS. 6-9.

FIG. 1 shows the MCs and the MTEs as co-located entities. Again, the MC handles the mobility control logic, while the MTE provides the data plane operations. The MC and MTE functions may be encompassed in a single physical entity. When integrated in a single entity or unit, the MC configures its data plane, the MTE function, through a set of application programming interfaces (APIs) or commands. Thus, in the MC/MTE single unit integrated configuration, the MTE is the data path of the MC. However, when the MC and MTE functions are embodied in separate entities, some additional signaling for the commands is necessary between the MC and the MTE. This would involve the MC forwarding portions of the signaling it had received from an access switch to configure the forwarding tables stored at the MTE. The separation of these functions makes it possible to deploy a network that does not make use of tunneling. Such a network would still require the mobility control plane, provided by the MC, but would not require the functions of the MTE.

Figure 2:
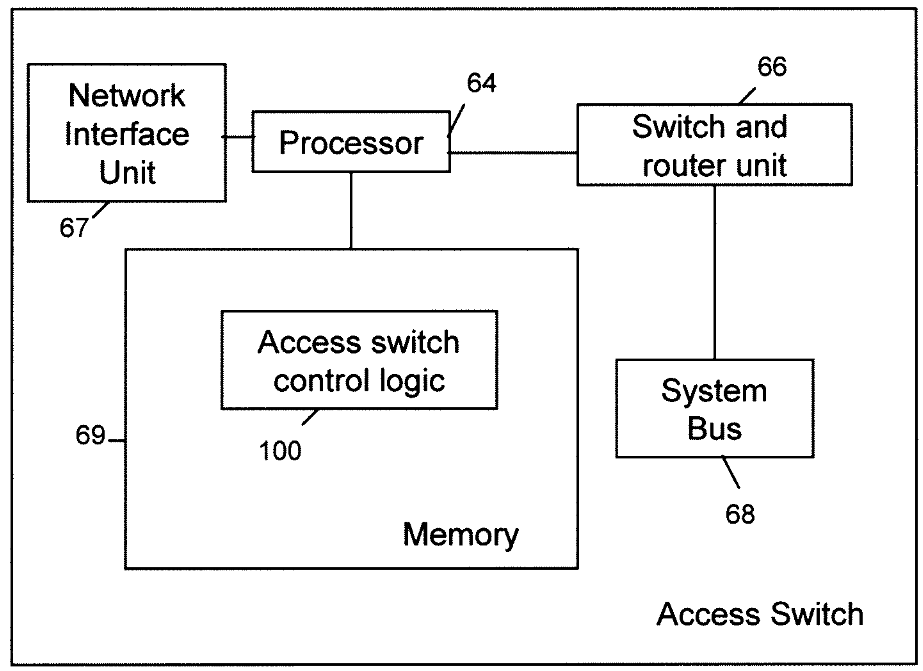
FIG. 2 is an example of a block diagram of an access switch that is part of the network infrastructure architecture shown in FIG. 1.

Reference is now made to FIG. 2 for a description of an example block diagram of an access switch. This diagram is meant to representative of a block diagram for any of the access switches 60(1)-60(4) and 62(1)-62(4) shown in FIG. 1, and in general for any access switch in any mobility sub-domain. The access switch comprises a processor 64, a switch and router unit 66 that may be in the form of an Application Specific Integrated Circuit (ASIC), a network interface unit 67, a system bus 68 and a memory 70. The switch and router unit 66 provides the packet forwarding (routing) and switching functions that are well known for a network access switch. The network interface unit 67 processes packets for transmission over the network and processes packets received from the network For example, the network interface unit 67 is an Ethernet card or similar device. The access switch is also referred to herein as a "forwarder" because it forwards packets to and from a client device. Instructions for access switch control logic 100 are stored in the memory 69 for execution by the processor 64. As explained above, an access switch is configured to serve IP addresses in one or more IP subnets, and to assign an IP address for a device when the device connects to the network for the first time.

The processor 64 may be a programmable processor or a fixed-logic processor. In the case of a programmable processor, the memory 69 is any type of tangible processor readable memory (e.g., random access, read-only, etc.) that is encoded with or stores instructions that, when executed by the processor 64, cause the processor to perform a variety of functions including the functions of the access switch control logic 100 described herein. Alternatively, the processor 64 may a fixed-logic processing device, such as an ASIC or digital signal processor or a network processor or a general purpose processor, that is configured with firmware comprised of instructions that cause the processor(s) 64 to perform the functions described herein. Thus, instructions for the logic 100 may take any of a variety of forms, so as to be encoded in one or more tangible media for execution, such as with fixed logic or programmable logic (e.g., software/computer instructions executed by a processor) and the processor(s) 64 may be a programmable processor, programmable digital logic (e.g., field programmable gate array) or an ASIC that comprises fixed digital logic, or a combination thereof.

Examples of functions of the access switch control logic 100 are described hereinafter in connection with FIGS. 6-9. These functions include "mobility agent" functions and datapath functions. The mobility agent functions are responsible for handling mobility events on the access switch, configuring the datapath elements on the switch for mobility and communicating with the MC. The datapath functions include terminating the CAPWAP tunnels which encapsulate IEEE 802.11 traffic sourced by wireless client devices, allowing the access switch to treat wired and wireless traffic in a uniform fashion.

More specifically, the functions of the mobility agent in the access switch are as follows. The mobility agent is responsible for responding in a timely manner to mobility control protocol messages sent by the various entities in the network, ensuring that a roaming budget time period is maintained for client devices. If the wireless subnets are not available at the MC/MTE, then the mobility agent assumes the role of the point of presence for roamed client devices that were originally associated with it. When the network is configured in a Layer 2 mode, the mobility agent is responsible for advertising reachability for the client devices connected to it. If tunneling is employed, an ARP request would be transmitted on behalf of the client device through the tunnel, which the point of presence (MTE) would bridge onto its uplink interface. The mobility agent is responsible for subscribing to multicast groups on behalf of a client device after a roaming event has occurred. This information is passed as part of the context to the new access switch to ensure that the multicast flows follow the client device as it roams. When the access switch is connected to a Layer 3 access network, the mobility agent is responsible for injecting routes for the client devices that are associated with it for which tunneling is not provided. The mobility agent performs an 802.1X authenticator function for both wired and wireless client devices. Finally, when a station successfully authenticates to the network, the mobility agent forwards the Pairwise Master Key (PMK) to the MC, and the MC is responsible for flooding the PMK to all of the access switches in the mobility sub-domain.

Figure 3:
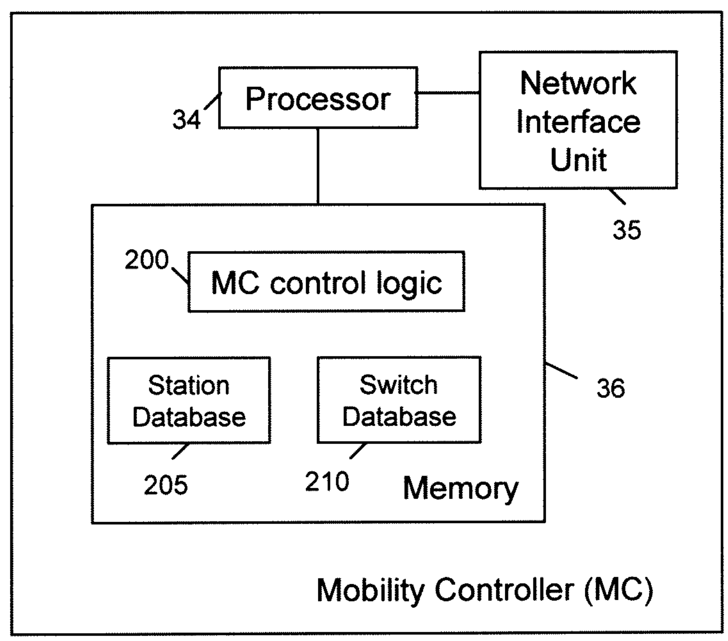
FIG. 3 is an example of a block diagram of mobility controller apparatus that is part of the network infrastructure architecture shown in FIG. 1.

Turning now to FIG. 3, an example block diagram of an MC is now described. An MC is a control apparatus that may be embodied by a computing apparatus comprising a processor 34, a network interface unit 35 and a memory 36. Examples of specific embodiments of the processor 34 and the network interface unit 35 are described above in connection with FIG. 2. The memory 36 stores MC control process logic that, when executed by the processor 34, cause the processor 34 to perform the MC functions described herein. In addition, the memory 36 stores a stations database 205 and a switch database 210.

The stations database 205 maintains a database of all wireless client devices that are being served within the local sub-domain or the entire mobility domain (if the MC is configured to serve the entire mobility domain). This database may not store full client device context and may only include information indicating whether the client device currently considers the local sub-domain as its home, and is in many ways very similar to the function provided by the mobility oracle, although with a more limited scope, i.e., only for client devices local to the sub-domain. The database may include additional information such as the client device's credentials, which could be in the form of the user's identity, or a common name in a certificate, as well as the IP Address assigned to the device, if one has already been assigned to it by the network.

The switch database 210 maintains a database of all access switches within the mobility sub-domain, and updates all of the access switches, in real-time, as changes to the database occur (e.g., addition or removal of a switch from the network).

Other functions of the MC are summarized as follows. The MC is responsible for responding in a timely manner to mobility control protocol messages from other entities to ensure that the system achieves the desired roaming budget. The MC acts as a gateway between the access switches and the mobility oracle. When the MC does not find a match in its local database, it forwards the request to the mobility oracle, which is responsible for the entire mobility domain. However, there are deployment scenarios where the MC is responsible for the entire mobility domain. When tunneling is employed for a client device, its point of presence on the network could be the MTE if the wireless subnets are available at the MTE. Therefore, in these cases, the MC will respond to any ARP requests received for the client devices it is responsible for. When the MC is connected to a Layer 3 network, it is responsible for injecting routes into the network for the client devices it provides service for via a tunnel. The MC is the control point for the access switches for all mobility management related requests. When a change in a client device's point of attachment occurs, the MC is responsible for configuring the proper forwarding policy on the MTE, which may be co-located with the MC. If the MC and the MTEs are physically separate, the MC is responsible for initiating the signaling to the MTE to enforce changes in the client device's point of attachment in the network. The MC is capable of handling unsolicited commands from the Remote Authentication Dial-in User Service (RADIUS) infrastructure. These messages can be received by an access switch and forwarded to the MC to clear out or update the client key cache entries. It is also the responsibility of the MC to forward these messages to other MCs in mobility domain if a message is received from access switch. Finally, the MC optionally acts as an Network Time Server to the access switches to allow all access switches within a mobility sub-domain to have their clocks synchronized. The MC in turn synchronizes its clock off the mobility oracle.

Figure 4:
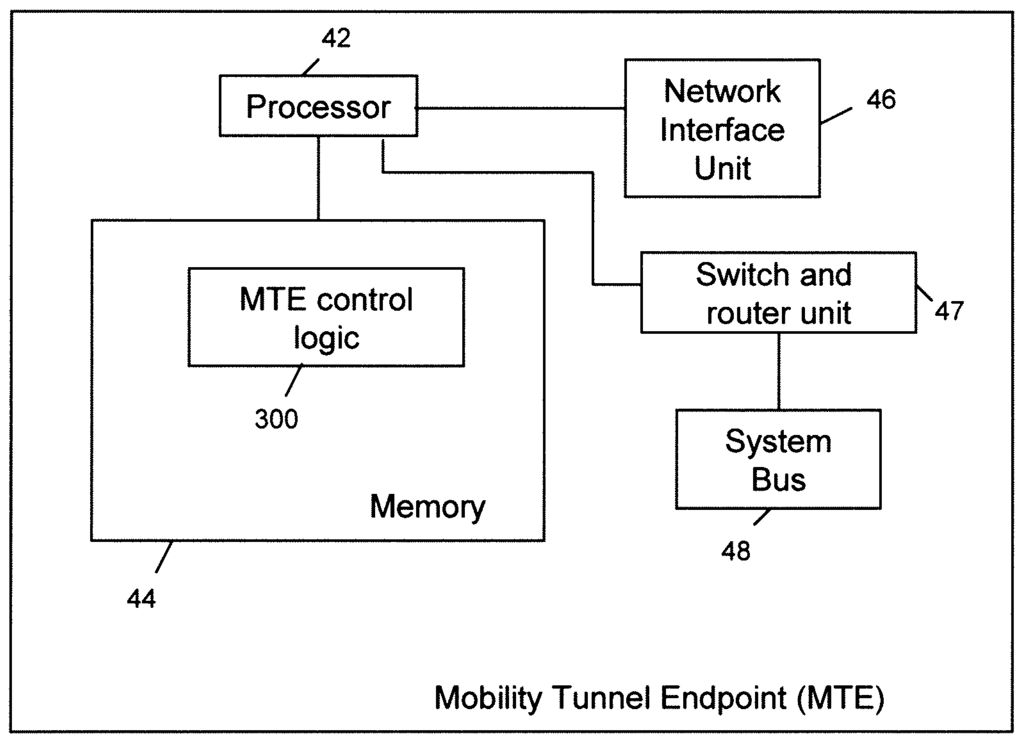
FIG. 4 is an example of a block diagram of a mobility tunnel endpoint apparatus that is part of the network infrastructure architecture shown in FIG. 1.

Turning to FIG. 4, an example block diagram of an MTE is now described. The MTE is a routing apparatus that may also have processing functions. The MTE comprises a processor 42, a memory 44 and a network interface unit 46. The MTE may be integrated into a distribution switch or router and to this end FIG. 4 shows basic switching components including a switch and router unit 47 and a system bus 48. Instructions are stored in the memory 44 for MTE control logic 300. The processor 42 executes the instructions for the MTE control logic 300 to perform the various MTE functions described herein.

The MTE handles the mobility data plane. The role of the MTE is different depending on whether or not it is serving as the point of presence for client devices in the sub-domain. If the wireless subnets are not available at the MTE, then the point of presence for roamed client devices is at the home access switch. In this scenario, the MTE serves as a tunnel switching entity that connects the foreign access switch (point of attachment) to the home access switch (point of presence). If the wireless subnets are available at the MTE, then the MTE serves as the point of presence.

The functions of the MTE are generally as follows. The MTE terminates "mobility" tunnels from the access switches in its mobility sub-domain. Thus, there are pre-established tunnels between the MTE and each access switch in a given mobility sub-domain. Traffic to and from the roamed client device is sent to the foreign access switch via the mobility tunnel. An MTE-MTE tunnel is used to tunnel traffic between mobility sub-domains. The MTE has an interface the MC uses to configure the MTEs forwarding tables to reflect mobility events. When the MC and MTE are collocated, this is simply an API. If both functions are not collocated, this is a protocol. Moreover, according to the techniques described herein, the MTE in a mobility sub-domain takes on the point of presence responsibility for all IP subnets used in its mobility sub-domain for a wireless station that roams from an access switch that serves its IP subnet to an access switch that does not serve its IP subnet.

As explained herein, the MC and MTE functions may be implemented by separate physical entities. In the case where they are implemented in a single entity, the MTE does not actually act as a router, and therefore does not inject routes into the network. The MC is responsible for advertising routes. However, the interfaces on which the routes are injected are considered part of the MTE. In the unlikely event that the MTE is decoupled from the MC, it is responsible for transmitting certain packets on behalf of the MC. For instance, the MC will provide Proxy ARP and routing services, yet these packets are transmitted on the MTEs interfaces. For networks that do not make use of tunneling, the MTE is not a necessary function.

Figure 5:
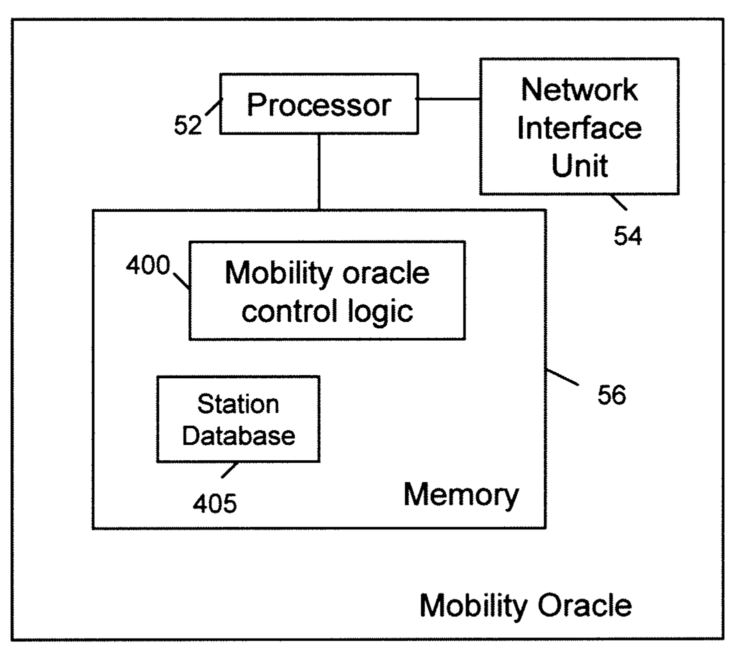
FIG. 5 is an example of a block diagram of a mobility oracle apparatus that is part of the network infrastructure shown in FIG. 1.

Reference is now made to FIG. 5 for a description a block diagram of the mobility oracle 50. The mobility oracle 50 is a central controller for the mobility domain and contains a centralized database that includes information on each of the client devices in the network, their home mobility sub-domain and the current foreign sub-domain providing service. The mobility oracle 50 is a computing apparatus with network connectivity that oversees the entire mobility domain, but it does not necessarily perform any routing or packet forwarding functions. The mobility oracle 50 comprises a processor 52, a network interface unit 54 to provide network connectivity with the MCs and MTEs in the mobility domain, and a memory 56 that stores mobility oracle control logic 400 and a station database 405. The station database 405 maintains a database of all stations that are being provided service within the mobility domain. This station database 405 is populated through interactions the mobility oracle has with all of the MCs in all of the mobility sub-domains it supports. The station database includes each station's MAC address, its current home mobility sub-domain, and if roaming, its current foreign mobility sub-domain. When the mobility oracle 50 receives a request from an MC, it is responsible for performing the station lookup, and forwarding the request to the proper MC. The mobility oracle 50 acts as an NTP server to the MCs to allow all of the controllers within the mobility domain to have their clocks synchronized. The functions of the mobility oracle control logic 400 are described hereinafter in connection with FIGS. 8-11.

The following terms are defined for convenience in connection with the descriptions herein.

Foreign Mobility Controller: The MC providing mobility management service for the client device in a foreign mobility sub-domain. The foreign MC acts as a liaison between access switches in the foreign sub-domain and the MC in the home sub-domain.

Foreign Mobility Sub-Domain: The mobility sub-domain, controlled by a MC, supporting a client device which is anchored in (its IP address is part of an IP subnet of) another mobility sub-domain.

Foreign Switch: The access switch in the foreign mobility sub-domain currently providing service to the client device.

Home Mobility Controller: The MC providing the single point of control and mobility management service for client devices in their home mobility sub-domain.

Home Mobility Sub-Domain: The mobility sub-domain, controlled by a MC, for a client device where its IP address was assigned.

Home Access Switch: The access switch in the home mobility sub-domain that serves the IP subnet that includes the IP address of the client device and that last provided service to that client device. The Home Access Switch may not be the access switch where the wireless device initially joined the mobility domain.

Mobility Domain: A collection of mobility sub-domains across which mobility needs to be supported.

Mobility Sub-Domain: The mobility sub-domain is an autonomous component of the overall mobility domain network. A sub-domain generally connects into the core network, and includes one or more MC functions, and optionally their associated MTEs. A mobility sub-domain is the set of devices managed by the active Mobility Controller. A mobility sub-domain comprises of a set of access switches, and associated APs, across which fast roaming is desired. A mobility sub-domain is equivalent to an 802.11 r key domain. The mobility sub-domain may also be referred to as an IP Everywhere (IPe) sub-domain. A mobility sub-domain and an mobility sub-domain are terms that are used interchangeably herein.

Point of Attachment: A client device's point of attachment is where the client is currently associated to the wireless network. This could either be the access switch that is currently providing service to the AP where the client device is associated, or the WLAN controller in the case of a legacy deployment. Thus, a wireless client device may roam from one AP on a first access switch to another AP on a second access switch and thereby become "attached" at or on the second access switch.

Point of Presence: A client device's point of presence is the place in the network where the client device is being advertised. For instance, if an MTE is advertising reachability to the client device via a routing protocol, the interface on which the route is being advertised is considered the client device's point of presence.

Station: A client device that connects to and requests service from the network. The device may have a wired, wireless or both interfaces. The term station may be used interchangeably with the term client device.

As explained above, the MTE can have two different roles depending on the availability of the subnets for the roamed station at the MTE. If the subnet of the roamed station is available at the MTE, the MTE could become the point of presence; otherwise it functions as a tunnel switching entity that connects the roamed station to the point of presence, which could be an access switch. In the following examples and in accordance with the techniques described herein, the tunneling architecture is used and the wireless IP subnets, i.e., VLANs, are available at the MTE for a given mobility sub-domain.

When the MTE, which is located at the routing boundary or distribution switch for a mobility sub-domain, has access to all the VLANs or subnets in the mobility sub-domain that may be visited by mobile stations, then the point of presence for an Layer 3 roamed station may move to the MTE. As explained above in connection with FIG. 1, the MTE for a given mobility sub-domain is connected to the network by an IEEE 802.1 q trunk and has access to all the wireless VLANs or subnets for that mobility sub-domain. This allows the MTE to natively act as the point of presence for any station that is home to that mobility sub-domain, and also allows for tunneling between MTEs of different mobility sub-domain when a station roams to a foreign mobility sub-domain. When the MTE is integrated in a border router or distribution switch in the mobility sub-domain, the border router or distribution switch is configured to become the point of presence for the wireless device.

Reference is now made to FIG. 6-9. In the scenarios described hereinafter in connection with FIGS. 6-9, a wireless station roams from one access switch to another access switch by associating with an AP on a different access switch. For simplicity, a wireless station is said to roam from access switch to access switch but it is understood that this involves the wireless station leaving the service of one AP and associating to an AP on a different access switch.

Figure 6:
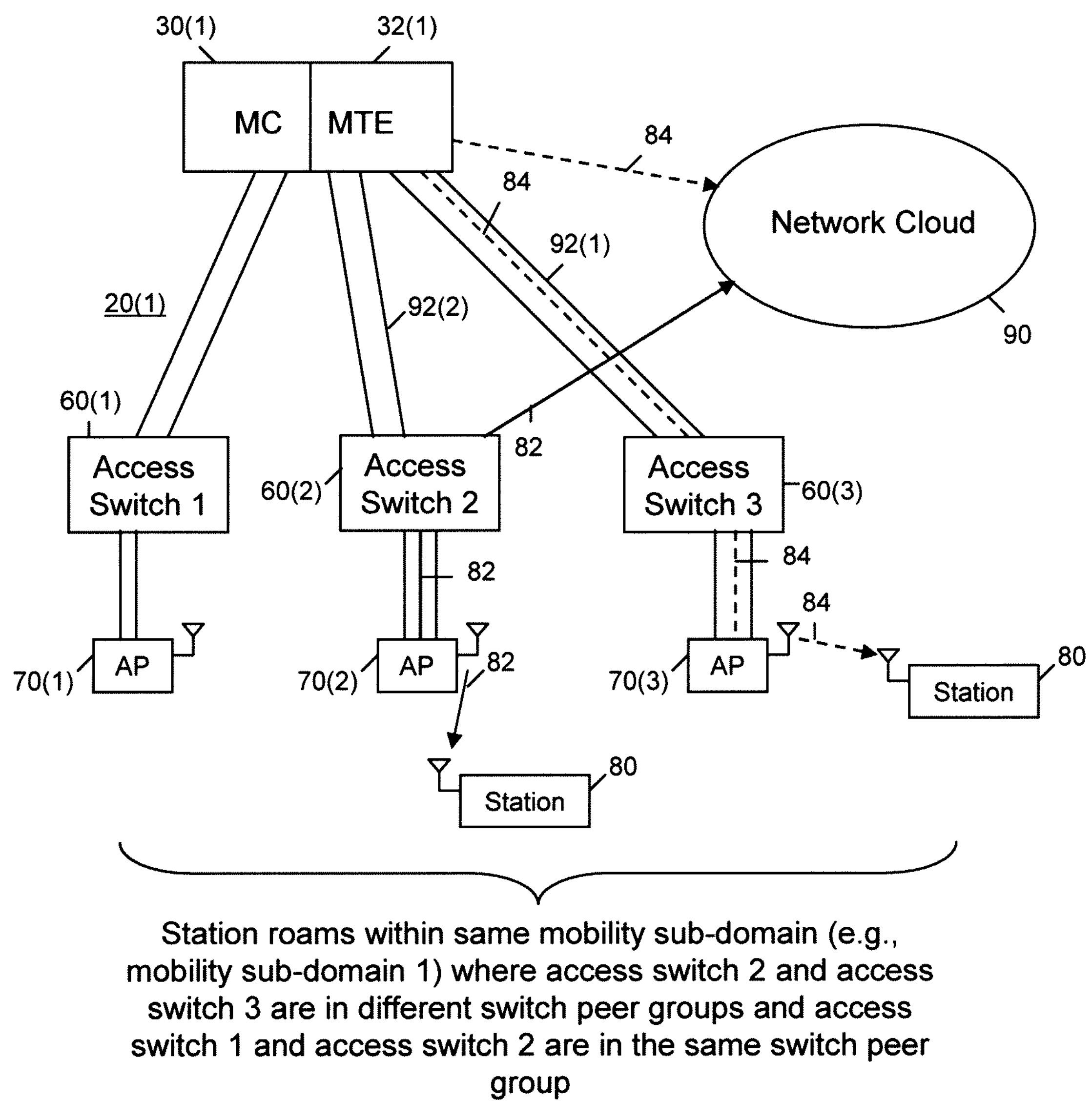
FIG. 6 is an example of a diagram showing part of the network infrastructure depicted in FIG. 1 and further illustrating a device roaming between access switches in a mobility sub-domain.
Figure 7:
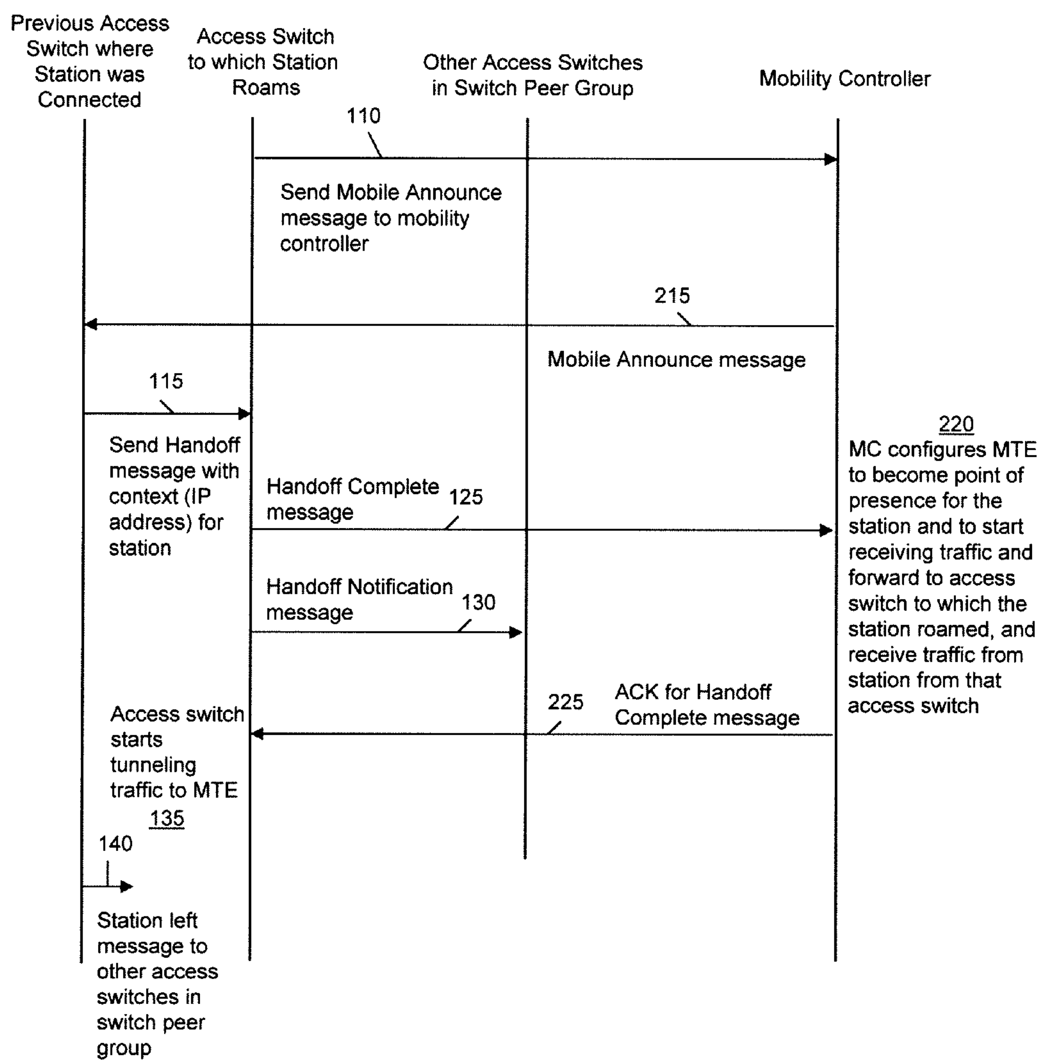
FIG. 7 is an example of a flow diagram illustrating control signaling between entities for the roaming scenario depicted in FIG. 6.
Figure 8:
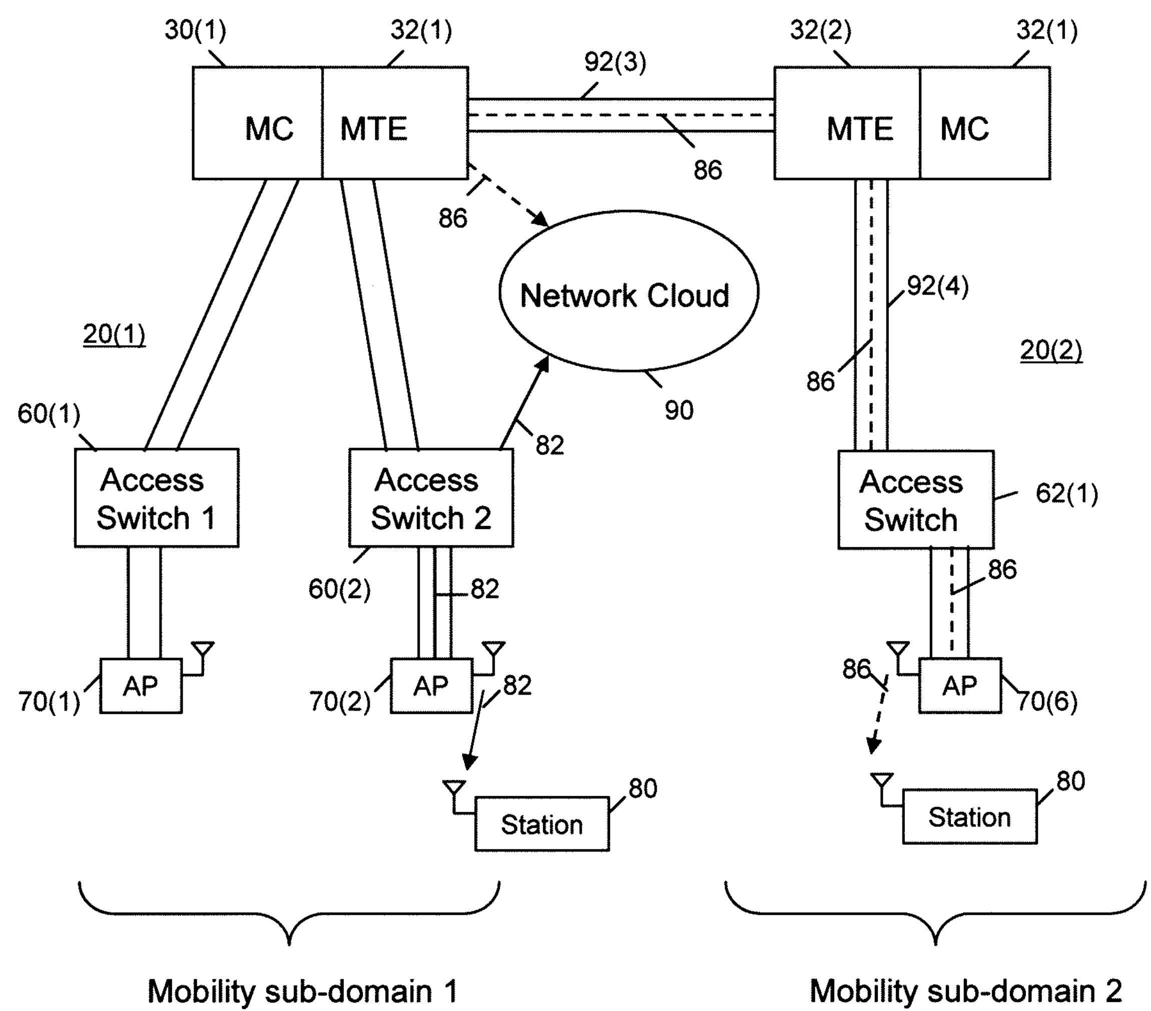
FIG. 8 is an example of a diagram showing part of the network infrastructure depicted in FIG. 1 and further illustrating a device roaming between access switches across mobility sub-domains.

FIG. 6 illustrates a scenario where a wireless station roams within a mobility sub-domain from one access switch to another access switch, and across switch peer groups. In this scenario, the access switch to which the wireless station was previously attached is an access switch that serves the IP subnet that includes the IP address of the wireless station and the access switch to which the wireless station roams is an access switch that does not serve the IP subnet for the wireless station. Furthermore, the "previous" access switch from which the wireless station has roamed need not be the same access switch where the wireless station initially connected to the network since multiple access switches can serve multiple (and common) IP subnets. FIG. 7 illustrates a flow diagram depicting control signal flows for the scenario of FIG. 6. FIG. 8 illustrates a scenario where a wireless station roams across mobility sub-domains and FIG. 9 illustrates the control signaling flow for the scenario of FIG. 8.

Figure 9:
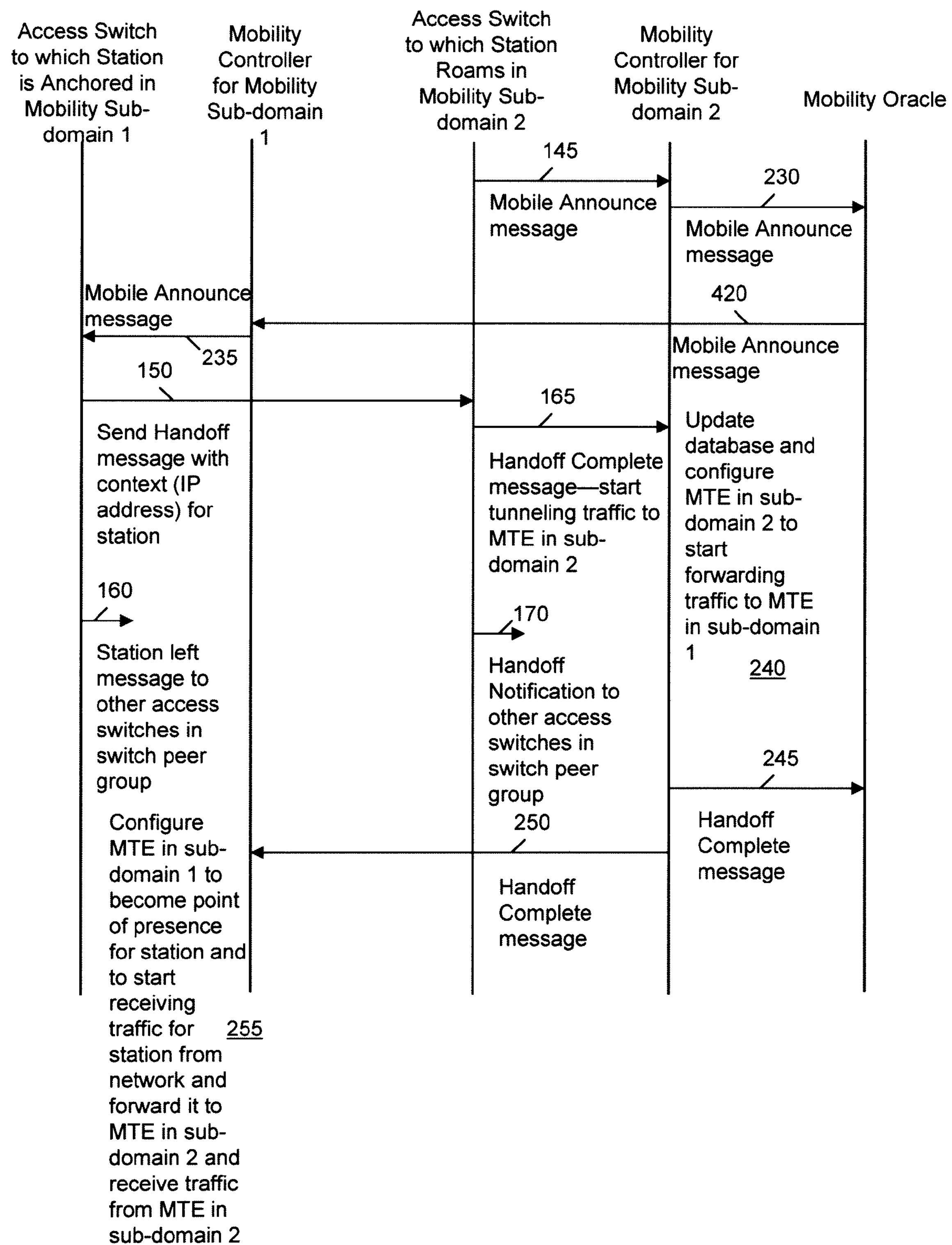
FIG. 9 is an example of a flow diagram illustrating control signaling between entities for the roaming scenario depicted in FIG. 8.

FIGS. 7 and 9 illustrate control signaling flows for two roaming scenarios. In FIGS. 7 and 9, reference numerals in the 100's refer to operations of an access switch, reference numerals in the 200's refer to operations of an MC, reference numerals in the 300's refer to operations of an MTE, and reference numerals in the 400's refer to operations of the mobility oracle.

Referring now to FIG. 6, a block diagram is shown of a portion of the mobility domain shown in FIG. 1, and in particular the MC, MTE and access switches within a single mobility sub-domain, e.g., sub-domain 20(1). In this example, access switches 60(1)-60(3) of sub-domain 20(1) are shown, where access switches 60(1) and 60(2) are part of the same switch peer group and access switch 60(3) is part of a different switch peer group. A wireless station 80 is shown that initially joins the network by associating to an AP 70(2) that is on access switch 60(2). Accordingly, the station 80 is given an IP address from a subnet available on, or served by, the access switch 60(2). Therefore, while the station 80 is associated to an AP on access switch 60(2), its point of presence and point of attachment are the same: access switch 60(2). As shown at the arrow 82, traffic for station 80 is natively bridged at the access switch 60(2) to the external network cloud shown at reference numeral 90. No tunneling is required for the station's traffic.

When station 80 roams to an access switch where its IP subnet is not available (not served by that different access switch), this triggers a mobility event. For example, the station 80 roams to and associates with an AP 70(3) on access switch 60(3), which in this example, is in a different switch peer group than access switches 60(1) and 60(2). Through exchanges of messages described hereinafter in connection with FIG. 7, the MTE 32(1) is configured to send traffic for the station 80 to and receive traffic from the access switch 60(3) in a tunnel 92(1) between the MTE 32(1) and the access switch 60(3). The MTE 32(1) becomes the point of presence for the station 80 and the MTE 32(1) is responsible for advertising the serviceability for the station 80 directly, by transmitting an ARP request. Thus, as shown by the dashed arrow at reference numeral 84, traffic for station 80 (after it has roamed) to and from the network cloud 90 passes through the MTE 32(1). When station 80 sends outbound traffic to a wired host (in the network cloud 90), the traffic is tunneled from access switch 60(3) in tunnel 92(1) to the MTE 32(1) which forwards the traffic natively to the network cloud 90 since the IP subnet for the station 80 is available at the MTE 32(1). Similarly, since the point of presence is at the MTE 32(1), the inbound traffic from a wired host (in the network cloud 90) intended for the station 80 comes to the MTE 32(1) since the station 80 is advertised by the MTE 32(1), and the inbound traffic is sent in tunnel 92(1) from the MTE 32(1) to access switch 60(3) where the station 80 is currently attached.

Reference is now made to FIG. 7 for a description of the control message/signaling flow between the various entities to facilitate the intra-sub-domain roaming scenario shown in FIG. 6. Again, this control signal flow is for the situation when a station roams from one access switch in one switch peer group to another access switch in another switch peer group (or more generally between access switches in a deployment that does not use switch peer groups) in the same mobility sub-domain. One example is shown in FIG. 6 where the station roams from access switch 60(2), where it originally joined the network (and is also in this example the last access switch to which the station was associated where its IP subnet is available) to another access switch 60(3). When the access switch to which the station roams detects the association of the station (by way of an AP on that access switch) and after the station is authenticated, it sends a Mobile Announce message to the mobility controller for that mobility sub-domain. This is shown at reference numeral 110. The Mobile Announce message comprises information identifying the roamed station, e.g., MAC address of the roamed station of the roamed station and an identifier of the access switch to which the station has roamed. The mobility controller for that mobility sub-domain receives the Mobile Announce message and does a look up in its station database to determine the access switch where the station was last attached where its IP subnet is available, which may, but not in all cases, be the access switch where the station initially joined to the network. After making this determination, the mobility controller at 215, sends the Mobile Announce message to the access switch where the station was previously attached. Again, the mobility controller stores information indicating which IP subnets are served by which access switches in its mobility sub-domain. The access switch that receives the Mobile Announce message obtains the identity of the original source of the Mobile Announce message (the access switch where the station as roamed) and the identity of the station that has roamed, and at 115 sends a Handoff message to the access switch to which the station has roamed. Also at 115, the access switch where the station 80 was previously attached also deletes the station 80 from its database of stations that it is to serve. The Handoff message contains context information about the station, that is information identifying the station, including the IP address of the station and MAC address of the station and any policies associated with the station.

The access switch where the station is currently attached receives the Handoff message and generates a Handoff Complete message that it sends, at 125, to the mobility controller for the mobility sub-domain. The Handoff Complete message confirms that the station is connected at that access switch and also contains the identity of that access switch. In response to the mobility controller receiving and processing the Handoff Complete message, the mobility controller informs the Layer 2 network infrastructure (network cloud 90) about the presence of the station 80 at the MTE and configures the MTE to become the point of presence for the station 80 and to start receiving inbound traffic for the station 80 from the network cloud and forwarding the inbound traffic to the access switch where the station has roamed and is currently attached, and to receive outbound traffic from the station 80 from that access switch. At 130, the access switch where the station is currently attached sends a Handoff Notification message to other access switches in its switch peer group to update the location of the station among the switches in its switch peer group (if a switch peer group implementation is deployed).

At 225, the mobility controller sends to the access switch where the station is currently attached an acknowledgment (ACK) message for the Handoff Complete message. In response to receiving the ACK message, the access switch where the station is currently located starts sending traffic over a tunnel between it and the MTE as shown at reference numeral 135. At 140, the access switch from which the station has roamed sends out a message to its switch peer group members to notify them that the station has left the switch peer group.

The scenario depicted in FIGS. 6 and 7 may be summarized as follows. At a controller apparatus in a mobility sub-domain of a network, the mobility sub-domain comprising a plurality of access switches each serving one or more IP subnets that comprises a plurality of IP addresses, a determination is made that a wireless device that was previously associated to a wireless access point on a first access switch has roamed to and associated with a wireless access point on a second access switch in the mobility sub-domain. The controller apparatus configures a tunneling endpoint apparatus in the mobility sub-domain to become a point of presence for the wireless device and to receive inbound traffic to the wireless device and to forward the inbound traffic to the second access switch in a tunnel between the tunneling endpoint apparatus and the second access switch and to receive outbound traffic from the wireless device in the tunnel between the tunneling endpoint apparatus and the second access switch and to forward the outbound traffic natively from the tunneling endpoint apparatus.

From the perspective of a mobility controller configured to support the scenario depicted in FIGS. 6 and 7, such a mobility controller may be summarized as an apparatus comprising a network interface unit configured to enable communications over a network; and a processor configured to be coupled to the network interface unit. The processor is configured to: determine that a wireless device that was previously associated to a wireless access point on a first access switch in a mobility sub-domain comprising a plurality of access switches each serving one or more IP subnets that comprises a plurality of IP addresses, has roamed and associated to a wireless access point on a second access switch in the mobility sub-domain; and to configure a tunneling endpoint apparatus in the mobility sub-domain to become a point of presence for the wireless device and to receive inbound traffic to the wireless device and to forward the inbound traffic to the second access switch in a tunnel between the tunneling endpoint apparatus and the second access switch and to receive outbound traffic from the wireless device in the tunnel between the tunneling endpoint apparatus and the second access switch and to forward the outbound traffic natively from the tunneling endpoint apparatus. When the controller apparatus (MC) and tunneling endpoint apparatus (MTE) are integrated together into a single unit that comprises a switching unit, the processor configures the tunneling endpoint apparatus by configuring the switching unit to direct traffic for the wireless device in the tunnel to the second access switch.

The operations described above in connection with FIGS. 6 and 7 for a mobility controller may be also embodied as instructions stored in a processor readable medium that, when executed by a processor, cause the processor to perform those operations.

As explained herein, the MTE is a tunneling endpoint apparatus and it may be integrated in a single unit with the MC for a given mobility sub-domain and in each of the plurality of mobility sub-domains. In this case, then the operation 220 involves configuring a switching unit (e.g., switch and router unit 47 shown in FIG. 4) to direct traffic for the station in the tunnel to the second access switch. On the other hand, when the MTE is separate from the MC, this operation may involve sending a command to the MTE from the MC to configure the MTE to direct traffic for the device in the tunnel to the second access switch.

Reference is now made to FIG. 8. FIG. 8 shows a scenario where a station roams across mobility sub-domains to an access switch that is in a different mobility sub-domain from the mobility sub-domain of the access switch where it was previously attached. In this example, the station 80 is previously attached at access switch 60(2) in mobility sub-domain 20(1). Stations 80 roams to another mobility sub-domain, e.g., mobility sub-domain 20(2), where it associates with an AP 70(6) on access switch 62(1). (There are other access switches in mobility sub-domain 20(1) but for simplicity they are not shown in FIG. 8). FIG. 8 shows the native (home) routing of traffic for station 80 at reference numeral 82. In this roaming example, the traffic for the roamed station 80 is shown by dashed arrow 86. Inbound traffic from a wired host in the network cloud 90 is received at the MTE 32(1) that serves as the point of presence for the station 80 because mobility sub-domain 20(1) is the home mobility sub-domain for station 80. the MTE 32(1) sends the inbound traffic for the station 80 in a tunnel 92(3) to MTEs 32(2), and MTE 32(2) forwards that inbound traffic in a tunnel 92(4) to the access switch 62(1) where the station 80 is currently attached. Similarly, outbound traffic from the station 80 is sent in tunnel 92(4) from the access switch 62(1) to the MTE 32(2) in mobility sub-domain 20(2) and in tunnel 92(3) from MTE 32(2) to MTE 32(1) in mobility sub-domain 20(1), and the MTE 32(1) forwards that outbound traffic natively to the destination wired host in the network cloud 90.

Reference is now made to FIG. 9 for an example of the control signaling flow between entities to support the inter mobility sub-domain roaming scenario such as that shown in FIG. 8. When a station roams across mobility sub-domains, at 145, the access switch to which the station roams in, e.g., mobility sub-domain 2, generates a Mobile Announce message that it sends to the mobility controller for that sub-domain. This is particularly the case when it is the first time that the station appears in this mobility sub-domain. The access switch to which the station 80 attaches does not know the station 80 in this case. The mobility controller for the foreign mobility sub-domain, mobility sub-domain 2, also may not know the station 80 if it is the first time that the station is moving to this mobility sub-domain. Therefore, at 230, the mobility controller forwards the Mobile Announce message to the mobility oracle.

The mobility oracle determines, from its stations database, the mobility controller for the home mobility sub-domain for station 80 based on information contained in the Mobile Announce message that identifies the station 80. Using this information, at 420 the mobility oracle forwards the Mobile Announce message to the mobility controller for the home mobility sub-domain, e.g., mobility sub-domain 1. The mobility controller for the home mobility sub-domain of the station, mobility sub-domain 1, upon receiving the Mobile Announce message, at 235 forwards it to the access switch where the station was previously attached in mobility sub-domain 1 and which access switch serves the IP subnet for the station 80. This access switch, in response to receiving the Mobile Announce message, learns that the station 80 has roamed to a particular access switch in mobility sub-domain 2 from the content of the Mobile Announce message, and in response at 150 sends a Handoff message to the access switch in mobility sub-domain 2 where the station is currently attached. At 160, the access switch in mobility sub-domain 1 sends a message to other switches in its switch peer group (assuming a switch peer group implementation is used) to notify those access switches that the station has left the switch peer group.

At 165, in response to receiving the Handoff message, the access switch in mobility sub-domain 2 where the station is currently attached sends a Handoff Complete message to the mobility controller in mobility sub-domain 1. The access switch in mobility sub-domain 2 also starts tunneling traffic for the station to the MTE in mobility sub-domain 2. In response to receiving the Handoff Complete message from the access switch where the station is currently attached, the mobility controller in mobility sub-domain 2 updates its stations database accordingly and at 240, configures the MTE in mobility sub-domain 2 to start tunneling traffic for the station to the MTE in mobility sub-domain 1. Also, at 245 the mobility controller in mobility sub-domain 2 sends the Handoff Complete message to the mobility oracle.

At 170, the access switch where the station is currently attached sends a Handoff Notification message to other switches in its switch peer group in mobility sub-domain 2 (assuming that a switch peer group implementation is used). Finally, at 250, the mobility controller in mobility sub-domain 2 sends a Handoff Complete message to the mobility controller in mobility sub-domain 1. At 255, the mobility controller in mobility sub-domain 1 updates its database and configures the MTE in mobility sub-domain 1 to become the point of presence for the station 80 and to start receiving inbound traffic for the station from a wired host in the network cloud 90 and to forward it in the tunnel to the MTE in mobility sub-domain 2 (which in turn tunnels that inbound traffic to the access switch where the station is currently attached) and to receive outbound traffic from the station in the tunnel with the MTE in the mobility sub-domain 1 and to forward it natively to the network cloud 90 for the station 80.

As depicted in FIGS. 8 and 9, the tunneling will go between the MTEs of the two mobility sub-domains and the MTE in the home mobility sub-domain for the station will be the point of presence for the station. Likewise, the station may further roam to other access switches in the foreign mobility sub-domain and the MC in that foreign mobility sub-domain will configure the MTE in that foreign mobility sub-domain to point the tunneling to the current point of attachment access switch. If the station roams to yet another foreign mobility sub-domain, the intervening mobility sub-domain where the station was previously located, is completely ignored and traffic is tunneled between the MTE of the home mobility sub-domain and the MTE of the most current foreign mobility sub-domain.

Thus, the scenario depicted in FIGS. 8 and 9 may be summarized as follows. At a controller apparatus in a second mobility sub-domain of a network comprising a plurality of mobility sub-domains, each mobility sub-domain comprising one or more access switches that serve one or more IP subnets that comprises a plurality of IP address, a mobile announce message is received from an access switch in the second mobility sub-domain, the mobile announce message indicating that a wireless device has roamed to and associated with a wireless access point on the access switch in the second mobility sub-domain. The controller apparatus in the second mobility sub-domain forwards the mobile announce message to a central controller apparatus (the mobility oracle) for the plurality of mobility sub-domains, which central controller apparatus determines that the wireless device roamed from a first mobility sub-domain where it was previously associated to a wireless access point on an access switch in the first mobility sub-domain. The central controller apparatus forwards the mobile announce message to a controller apparatus in the first mobility sub-domain. At the access switch where the wireless device is attached in the second mobility sub-domain, outbound traffic from the wireless device is sent in a tunnel to a tunneling endpoint apparatus in the second mobility sub-domain and inbound traffic for the wireless device is received in the tunnel from the tunneling endpoint apparatus in the second mobility sub-domain. At the controller in the second mobility sub-domain, the tunneling endpoint apparatus in the second mobility sub-domain is configured to forward the outbound traffic from the wireless device in a tunnel to a tunneling endpoint apparatus in the first mobility sub-domain and to receive inbound traffic for the wireless device in the tunnel from the tunneling endpoint apparatus in the first mobility sub-domain. At the controller in the first mobility sub-domain, the tunneling endpoint apparatus in the first mobility sub-domain is configured to become a point of presence for the wireless device such that the tunneling endpoint apparatus in the first mobility sub-domain receives the inbound traffic for the wireless device and forwards it in the tunnel to the tunneling endpoint apparatus in the second mobility sub-domain and receives the outbound traffic from the wireless device in the tunnel from the tunneling endpoint apparatus in the second mobility sub-domain and forwards the outbound traffic natively.

When the controller apparatus and tunneling endpoint apparatus are integrated into a single unit and which further comprises a switching unit (e.g., switch and router 47 shown in FIG. 4), and the configuring of the tunneling endpoint apparatus may comprise supplying a command to a switching unit in the respective single units (combined MC/MTE) to configure the switching unit to select traffic for the device in the respective tunnels.

From the perspective of an MC configured to support the scenario depicted in FIGS. 8 and 9, an apparatus is provided comprising a network interface unit configured to enable communications over a network and a processor configured to be coupled to the network interface unit. The processor is configured to receive a mobile announce message indicating that a wireless device that previously associated to a wireless access point on an access switch in a first mobility sub-domain of a mobility domain comprising a plurality of mobility sub-domains, each mobility sub-domain comprising one or more access switches that serve one or more IP subnets each comprising a plurality of IP addresses, has roamed and associated to a wireless access point on an access switch in a second mobility sub-domain. The processor configures a tunneling endpoint apparatus in the second mobility sub-domain to forward the outbound traffic from the wireless device in a tunnel to a tunneling endpoint apparatus in the first mobility sub-domain and to receive inbound traffic for the wireless device in the tunnel from the tunneling endpoint apparatus in the first mobility sub-domain. The processor generates a handoff complete message to be sent to a controller apparatus in the first mobility sub-domain to cause the controller apparatus in the first mobility sub-domain to configure a tunneling endpoint apparatus in the first mobility sub-domain to become a point of presence for the wireless device such that the tunneling endpoint apparatus in the first mobility sub-domain receives the inbound traffic for the wireless device and forwards it in the tunnel to the tunneling endpoint apparatus in the second mobility sub-domain and receives the outbound traffic from the wireless device in the tunnel from the tunneling endpoint apparatus in the second mobility sub-domain and forwards the outbound traffic natively.

The operations for the MC summarized above for the scenario of FIGS. 8 and 9 may be embodied as instructions stored in a processor readable medium that, when executed by a processor, cause the processor to perform those operations.

The techniques described herein have several advantages. First, both wired and wireless clients can be present on the same IP subnet, allowing for uniform handling of wired and wireless clients, uniform policy application and uniform management of the clients. Second, this hierarchical architecture allows the network to scale much better and support more APs and clients, compared to current architectures. This is achieved primarily by controlling the cost of handoffs on the control path, and by distributing the data path to the access switches. Third, by configuring the point of presence for a station on the home tunneling endpoint apparatus, a flexible deployment of the MCs/MTEs may be made. Customers who have their current WLAN controllers in the core (past the first routing boundary) can easily migrate to this architecture, while existing WLAN controllers can continue to operate in the network as MCs/MTEs.

The above description is by way of example only.

What is claimed is:

1. A method comprising:

at a controller apparatus in a second mobility sub-domain of a network comprising a plurality of mobility sub-domains, each mobility sub-domain comprising one or more access switches that serve one or more Internet Protocol (IP) subnets that comprises a plurality of IP address, receiving from an access switch in the second mobility sub-domain a mobile announce message indicating that a wireless device has roamed to and associated with a wireless access point on the access switch in the second mobility sub-domain;

forwarding the mobile announce message to a central controller apparatus for the plurality of mobility sub-domains, which central controller apparatus determines that the wireless device roamed from a first mobility sub-domain where it was previously associated to a wireless access point on an access switch in the first mobility sub-domain;

forwarding the mobile announce message from the central controller apparatus to a controller apparatus in the first mobility sub-domain;

at the access switch where the wireless device is attached in the second mobility sub-domain, sending outbound traffic from the wireless device in a tunnel to a tunneling endpoint apparatus in the second mobility sub-domain and receiving inbound traffic for the wireless device in the tunnel from the tunneling endpoint apparatus in the second mobility sub-domain;

at the controller in the second mobility sub-domain, configuring the tunneling endpoint apparatus in the second mobility sub-domain to forward the outbound traffic from the wireless device in a tunnel to a tunneling endpoint apparatus in the first mobility sub-domain and to receive inbound traffic for the wireless device in the tunnel from the tunneling endpoint apparatus in the first mobility sub-domain; and at the controller in the first mobility sub-domain, configuring the tunneling endpoint apparatus in the first mobility sub-domain to become a point of presence for the wireless device such that the tunneling endpoint apparatus in the first mobility sub-domain receives the inbound traffic for the wireless device and forwards it in the tunnel to the tunneling endpoint apparatus in the second mobility sub-domain and receives the outbound traffic from the wireless device in the tunnel from the tunneling endpoint apparatus in the second mobility sub-domain and forwards the outbound traffic natively.

2. The method of claim 1, and further comprising forwarding the mobile announce message from the controller apparatus in the first mobility sub-domain to the access switch in the first mobility sub-domain where the wireless device was previously attached, that causes the access switch in the first mobility sub-domain to send a handoff message that includes the IP address of the wireless device to the access switch in the second mobility sub-domain where the wireless device is currently attached; and sending a handoff complete message from the access switch in the second mobility sub-domain to the controller apparatus in the second mobility sub-domain.

3. The method of claim 2, and further comprising at the controller apparatus in the second mobility sub-domain, in response to receiving the handoff complete message from the access switch in the second mobility sub-domain, updating a database of information indicating mobility sub-domain locations of devices and configuring the tunneling endpoint apparatus in the second mobility sub-domain to start sending traffic in the tunnel to the tunneling endpoint apparatus in the first mobility sub-domain.

4. The method of claim 3, and further comprising sending the handoff complete message from the controller apparatus in the second mobility sub-domain to the controller apparatus in the first mobility sub-domain, and wherein configuring the tunneling endpoint apparatus in the first mobility sub-domain is responsive to receiving the handoff complete message at the controller apparatus in the first mobility sub-domain.

5. The method of claim 1, wherein configuring the tunneling endpoint apparatus in the first mobility sub-domain comprises configuring a switching unit integrated in the tunneling endpoint apparatus in the first mobility sub-domain, and configuring the tunneling endpoint apparatus in the second mobility sub-domain comprises configuring a switching unit integrated in the tunneling endpoint apparatus in the second mobility sub-domain.

6. An apparatus comprising:

a network interface unit configured to enable communications over a network; and a processor configured to be coupled to the network interface unit, wherein the processor is configured to:

receive a mobile announce message indicating that a wireless device that previously associated to a wireless access point on an access switch in a first mobility sub-domain of a mobility domain comprising a plurality of mobility sub-domains, each mobility sub-domain comprising one or more access switches that serve one or more Internet Protocol (IP) subnets each comprising a plurality of IP addresses, has roamed and associated to a wireless access point on an access switch in a second mobility sub-domain;

configure a tunneling endpoint apparatus in the second mobility sub-domain to forward outbound traffic from the wireless device in a tunnel to a tunneling endpoint apparatus in the first mobility sub-domain and to receive inbound traffic for the wireless device in the tunnel from the tunneling endpoint apparatus in the first mobility sub-domain;

generate a handoff complete message to be sent to a controller apparatus in the first mobility sub-domain to cause the controller apparatus in the first mobility sub-domain to configure a tunneling endpoint apparatus in the first mobility sub-domain to become a point of presence for the wireless device such that the tunneling endpoint apparatus in the first mobility sub-domain receives the inbound traffic for the wireless device and forwards it in the tunnel to the tunneling endpoint apparatus in the second mobility sub-domain and receives the outbound traffic from the wireless device in the tunnel from the tunneling endpoint apparatus in the second mobility sub-domain and forwards the outbound traffic natively; and forward the mobile announce message from the controller apparatus in the first mobility sub-domain to the access switch in the first mobility sub-domain where the wireless device was previously attached, that causes the access switch in the first mobility sub-domain to send a handoff message that includes the IP address of the wireless device to the access switch in the second mobility sub-domain where the wireless device is currently attached.

7. The apparatus of claim 6, and further comprising the tunneling endpoint apparatus integrated therein and which comprises a switching unit, and wherein the processor configures the tunneling endpoint apparatus by configuring the switching unit.

8. An apparatus comprising:

a network interface unit configured to enable communications over a network;

a processor configured to be coupled to the network interface unit, wherein the processor is configured to:

receive a mobile announce message indicating that a wireless device that previously associated to a wireless access point on an access switch in a first mobility sub-domain of a mobility domain comprising a plurality of mobility sub-domains, each mobility sub-domain comprising one or more access switches that serve one or more Internet Protocol (IP) subnets each comprising a plurality of IP addresses, has roamed and associated to a wireless access point on an access switch in a second mobility sub-domain;

configure a tunneling endpoint apparatus in the second mobility sub-domain to forward the outbound traffic from the wireless device in a tunnel to a tunneling endpoint apparatus in the first mobility sub-domain and to receive inbound traffic for the wireless device in the tunnel from the tunneling endpoint apparatus in the first mobility sub-domain; and generate a handoff complete message to be sent to a controller apparatus in the first mobility sub-domain to cause the controller apparatus in the first mobility sub-domain to configure a tunneling endpoint apparatus in the first mobility sub-domain to become a point of presence for the wireless device such that the tunneling endpoint apparatus in the first mobility sub-domain receives the inbound traffic for the wireless device and forwards it in the tunnel to the tunneling endpoint apparatus in the second mobility sub-domain and receives the outbound traffic from the wireless device in the tunnel from the tunneling endpoint apparatus in the second mobility sub-domain and forwards the outbound traffic natively;

receive a handoff complete message from the access switch in the second mobility sub-domain to update a database of information indicating mobility sub-domain locations of devices; and configure the tunneling endpoint apparatus in the second mobility sub-domain to start sending traffic in the tunnel to the tunneling endpoint apparatus in the first mobility sub-domain.

9. The apparatus of claim 8, and further comprising the tunneling endpoint apparatus integrated therein and which comprises a switching unit, and wherein the processor configures the tunneling endpoint apparatus by configuring the switching unit.

10. The method of claim 9, wherein configuring the tunneling endpoint apparatus comprises configuring a switching unit integrated in the tunneling endpoint apparatus.

11. A method comprising:

receiving a mobile announce message indicating that a wireless device that was previously associated to a wireless access point on an access switch in a first mobility sub-domain of a mobility domain comprising a plurality of mobility sub-domains, each mobility sub-domain comprising one or more access switches that serve one or more Internet Protocol (IP) subnets each comprising a plurality of IP addresses, has roamed and associated to a wireless access point on an access switch in a second mobility sub-domain;

configuring a tunneling endpoint apparatus in the second mobility sub-domain to forward the outbound traffic from the wireless device in a tunnel to a tunneling endpoint apparatus in the first mobility sub-domain and to receive inbound traffic for the wireless device in the tunnel from the tunneling endpoint apparatus in the first mobility sub-domain; and sending a handoff complete message to a controller apparatus in the first mobility sub-domain to cause the controller apparatus in the first mobility sub-domain to configure a tunneling endpoint apparatus in the first mobility sub-domain to become a point of presence for the wireless device such that the tunneling endpoint apparatus in the first mobility sub-domain receives the inbound traffic for the wireless device and forwards it in the tunnel to the tunneling endpoint apparatus in the second mobility sub-domain and receives the outbound traffic from the wireless device in the tunnel from the tunneling endpoint apparatus in the second mobility sub-domain and forwards the outbound traffic natively;

receiving a handoff complete message from the access switch in the second mobility sub-domain and updating a database of information indicating mobility sub-domain locations of devices based on the handoff complete message; and configuring the tunneling endpoint apparatus in the second mobility sub-domain to start sending traffic in the tunnel to the tunneling endpoint apparatus in the first mobility sub-domain.

* * * * *